(12) United States Patent
Woodworth et al.

(10) Patent No.: US 6,269,838 B1
(45) Date of Patent: Aug. 7, 2001

(54) ROTARY SERVOVALVE AND CONTROL SYSTEM

(75) Inventors: Raymond Dexter Woodworth, 2 Honeysuckle, Irvine, CA (US) 92614; James Edwin Bobrow, Huntington Beach, CA (US)

(73) Assignee: Raymond Dexter Woodworth, Irvine, CA (US)

( * ) Notice: Subject to any disclaimer, the term of this patent is extended or adjusted under 35 U.S.C. 154(b) by 0 days.

(21) Appl. No.: 09/430,880

(22) Filed: Nov. 1, 1999

Related U.S. Application Data
(60) Provisional application No. 60/113,165, filed on Dec. 22, 1998.

(51) Int. Cl.[7] ............................ F16K 11/076; F15B 13/044
(52) U.S. Cl. .............................. 137/625.22; 251/129.11; 251/129.04; 251/65
(58) Field of Search ..................... 137/625.22, 625.23, 137/554; 251/129.04, 283, 129.11, 65

(56) References Cited

U.S. PATENT DOCUMENTS

| | | | |
|---|---|---|---|
| 2,229,933 | * 1/1941 | Parker | 137/625.22 X |
| 2,907,349 | * 10/1959 | White | 137/625.22 |
| 4,199,007 | 4/1980 | Holmes . | |
| 4,227,164 | 10/1980 | Kitahara . | |
| 4,479,512 | 10/1984 | Ohrendorf . | |
| 4,510,403 | 4/1985 | Vanderlaan . | |
| 4,600,910 | 7/1986 | Vanderlaan . | |
| 4,612,526 | 9/1986 | Vanderlaan . | |
| 4,658,859 | * 4/1987 | Backe et al. | 137/625.23 |
| 4,794,845 | 1/1989 | Vick . | |
| 4,795,929 | 1/1989 | Elgass . | |
| 4,800,924 | 1/1989 | Johnson . | |
| 4,816,707 | 3/1989 | Vanderlaan . | |
| 4,858,650 | * 8/1989 | Devaud et al. | 137/625.22 |
| 4,883,981 | 11/1989 | Gerfast . | |
| 5,014,748 | * 5/1991 | Nogami et al. | 137/625.65 |

(List continued on next page.)

OTHER PUBLICATIONS

Ultimag Series Actuators from Ledex Actuation Products Catalog, pp. B1 –B10, dated Dec. 1996.
Pneumatic Servo Valve And Controller, with printout of web site pages from http://www.olsencontrols.com/p desc.htm on Oct. 19, 1999.

*Primary Examiner*—John Rivell
(74) *Attorney, Agent, or Firm*—Charles H. Thomas

(57) ABSTRACT

An improved rotary servovalve system employs a rotary magnetic solenoid having an armature that includes at least one permanent magnet. The armature is rotatable relative to a stator formed as an electromagnet which is energizable to create alternative electromagnetic fields having opposite polarities from each other. When deenergized, the stator allows the armature to return to a neutral, null position from positions of extreme rotation in opposite angular directions due to the magnetic force of the permanent magnet of the armature. The armature is coupled to carry a movable valve element in angular rotation therewith, so that flow through the servovalve of the system can occur in alternative directions. Also, the valve element is biased toward a position in which all of the valve ports are closed when power is removed from the rotary solenoid. The control circuit employed in the rotary servovalve system expands the bandwidth of response of the solenoid actuator by compensating for frequency variations in the input command signal and in the feedback signal. This compensation is achieved utilizing a combined proportional, integral, and differential amplification circuit. Also, imbalance of fluid forces within the servovalve mechanism can be avoided by utilizing a pair of inlet orifices, a pair of outlet orifices, a pair of first fluid control orifices, and a pair of second fluid control orifices. The orifices within each pair are located on opposite sides of the valve housing from each other.

15 Claims, 8 Drawing Sheets

U.S. PATENT DOCUMENTS

| | | |
|---|---|---|
| 5,020,417 | 6/1991 | Weyer . |
| 5,040,569 * | 8/1991 | Nogami et al. ............... 137/625.65 |
| 5,337,030 | 8/1994 | Mohler . |
| 5,427,350 * | 6/1995 | Rinkewich .................. 251/30.01 |
| 5,467,800 | 11/1995 | Sallas . |
| 5,564,470 * | 10/1996 | Denmark et al. ................. 137/554 |
| 5,597,014 | 1/1997 | Vick . |
| 5,868,165 | 2/1999 | Tranovich . |
| 5,954,093 | 9/1999 | Leonard . |
| 6,056,008 * | 5/2000 | Adams et al. ................. 137/487.5 |

\* cited by examiner

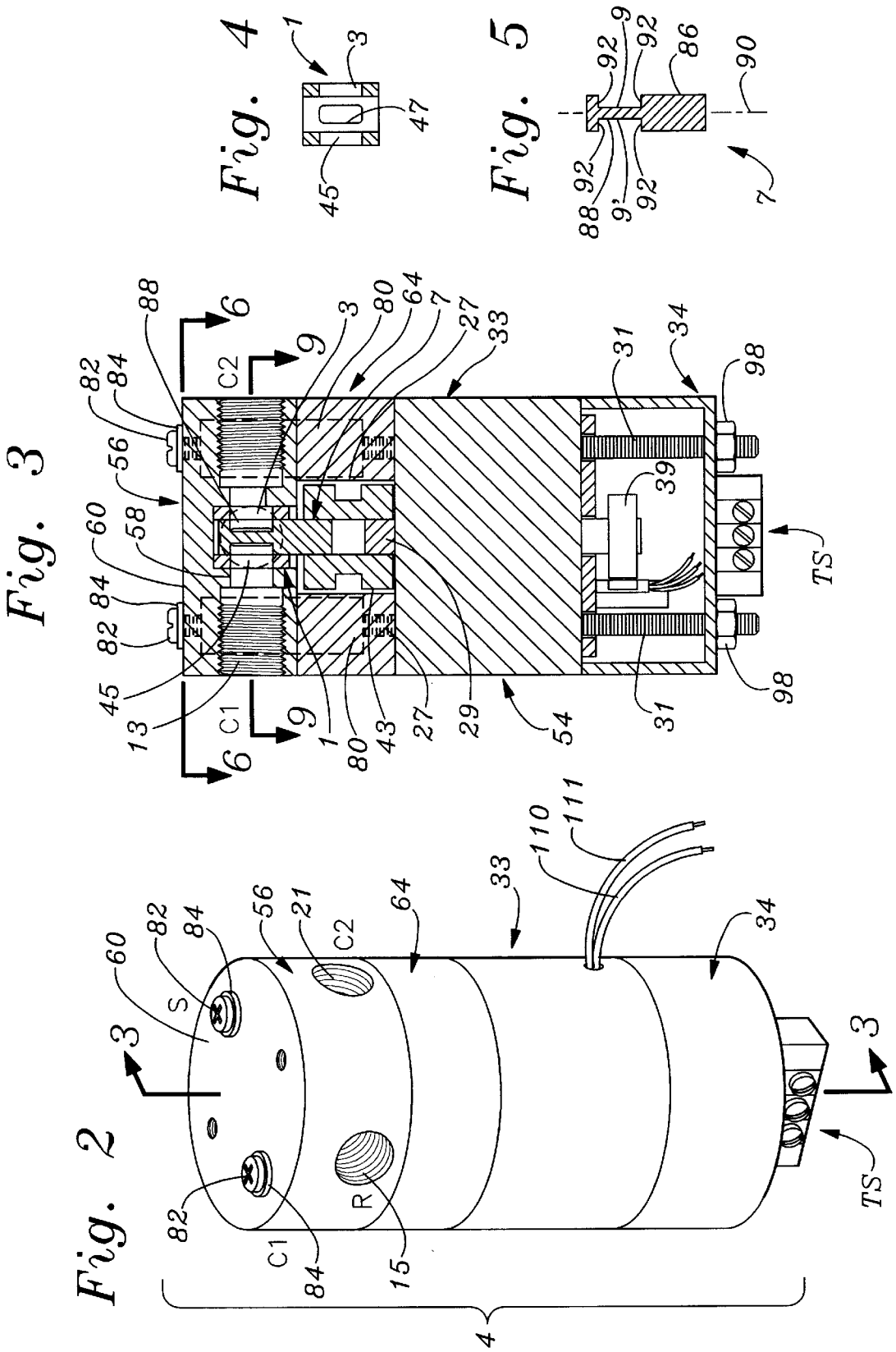

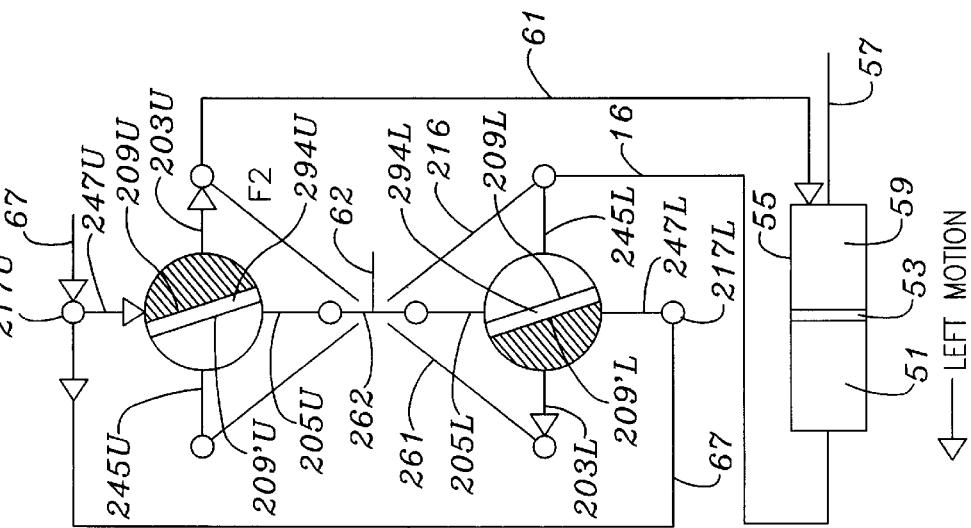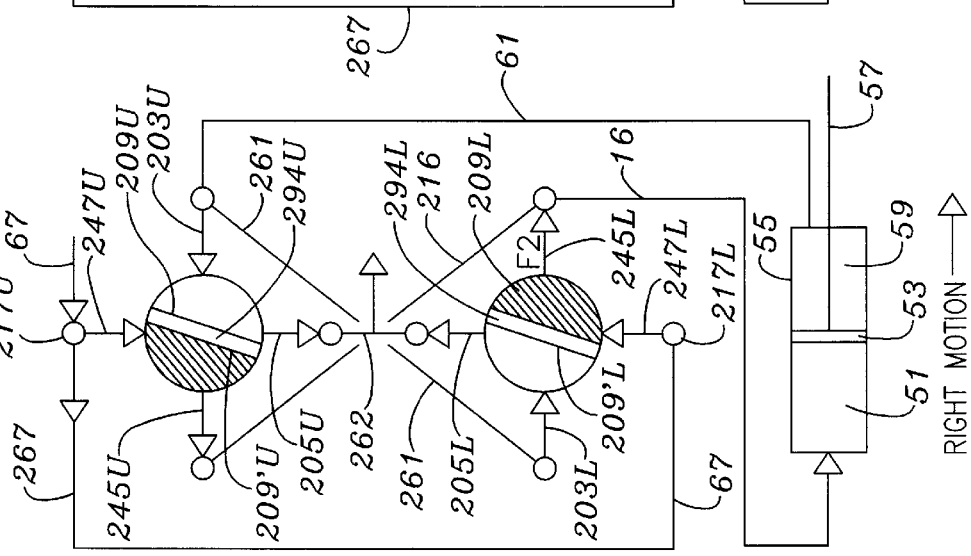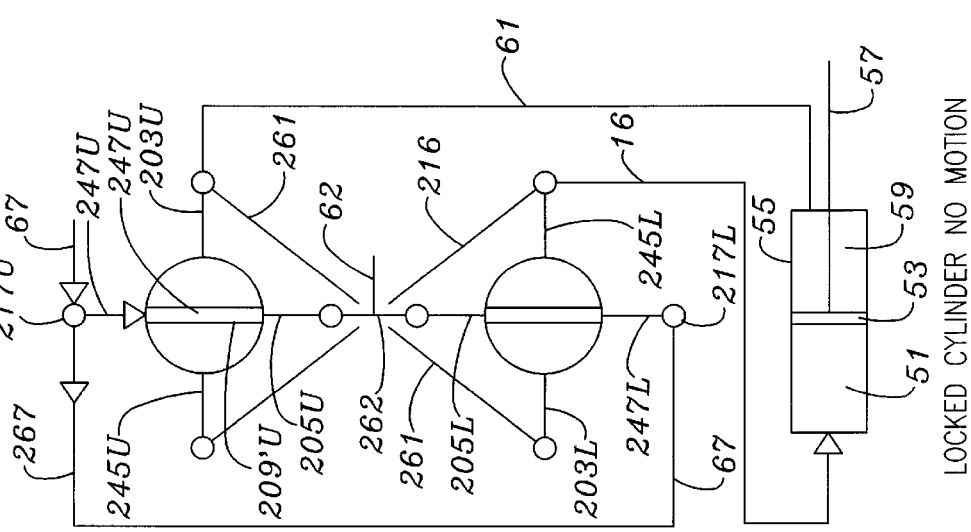

ROTARY SERVOVALVE AND CONTROL SYSTEM

This application claims the benefit of Provisional Application No. 60/113,165, filed on Dec. 22, 1998.

BACKGROUND OF THE INVENTION

1. Field of the Invention

The present invention relates to servovalves that are used to transfer quantities of fluid. The rotary servovalve and control system of the invention is particularly useful in situations requiring rapid response and precision control of fluid flow.

2. Description of the Prior Art

Many different mechanical and electrical servovalve systems have been employed for controlling fluid flow in industrial and manufacturing environments, as well as in other applications. Fluid servovalve control systems which require precise and highly responsive control are employed in a multitude of widely varying applications, including the control of robots, the operations of presses for manufacturing rubber and plastic parts, the control of tensioning devices in the paper industry, automotive vehicle and parts manufacturing, petroleum refining operations, and numerous other applications.

In many of the applications in which servo control valve systems are utilized, pressurized fluid is typically provided from a high pressure source and transmitted through a load from which the fluid is then exhausted to a low pressure reservoir. The load may, for example, take the form of a double-acting piston operating within a cylinder. The transfer of fluid from one side of the piston to the other within the cylinder causes the piston to move some mechanism to which it is connected.

Servovalves are widely utilized to control the flow of both pneumatic and hydraulic fluids. Conventional servovalves are often linear motion devices. That is, they typically consist of a spool element operated manually or electrically. Typically the spool element is shuttled back and forth within a chamber defined within a valve housing. By its movement the spool element covers and uncovers different fluid orifices or ports.

The function of a servovalve is to control the velocity and quantity of fluid flow and the direction of movement of a piston within a cylinder. Conventional servovalves typically contain a high torque motor connected to a flapper assembly. Such servovalve systems are expensive and require high manufacturing tolerances. They are also sensitive to contamination and clogging. Furthermore, they typically require continuous flow from a pump in order to operate.

Efforts have been made to develop rotary servovalves for use in servovalve systems. One such rotary servovalve is described in U.S. Pat. No. 4,794,845 which describes the application of a torque motor to a servovalve system. The torque motor controls flow by rotating a spool element within a complex sleeve assembly containing appropriate fluid passageways. In the event of a power failure a rather intricate arrangement of mechanical elements, including torque rods and springs, is required to center the servo valve in order to halt fluid flow. Also, when power is available, energy is required to center the valve for a zero command, no flow condition. This is necessary because torque motors are directional devices, but have no detent or zero position when power is removed. Consequently, the torque motor must always be energized or actuated throughout operation of a conventional rotary servovalve system.

U.S. Pat. No. 5,597,014 is directed to a high flow, direct drive rotary servovalve. This patent describes improvements in passageway designs, the function of which is to eliminate tangential Bernoulli reaction forces acting on the spool member. These forces tend to close the valve, thus requiring the torque motor to expend more energy in order to keep the valve open.

Prior rotary servovalve and control systems lack the requisite torque to be of commercial utility in many applications. This is because of the Bernoulli forces that are created with fluid flow and which tend to close the valve. Prior rotary servovalve and control systems provide elaborate means to combat the influence of these Bernoulli forces. For example, the rotary servovalve of U.S. Pat. No. 4,794,845 employs a very complex arrangement to overcome the Bernoulli forces.

SUMMARY OF THE INVENTION

The present invention is a rotary servovalve system that does not require a servomotor for actuation at all, but instead is able to utilize a rotary magnetic solenoid as the valve actuator. One type of suitable rotary solenoid actuator is a rotary magnetic solenoid having an armature that includes at least one permanent magnet and which is rotatable relative to a stator that is formed as an electromagnet. The stator is energizable by electrical current flow in alternative directions to alternatively and selectively create electromagnetic fields of opposite polarity from each other. Moreover, when the stator is deenergized, the permanent magnet or magnets of the armature return the armature to a neutral, null position from positions of rotation in opposite angular directions. The armature is coupled to carry a movable servovalve element in angular rotation therewith.

The rotary magnetic solenoid employed is a rotary bidirectional, high torque solenoid device. One line of suitable rotary magnetic solenoids for use according to the invention is manufactured by Lucas Control Systems Products located in Vandalia, Ohio and is sold as the Ultamag® series of rotary actuators. The armature of this type of rotary magnetic solenoid is centered through the use of permanent magnets and can be driven bidirectionally to either side of a zero or null position. This device is described in U.S. Pat. No. 5,337,030.

The armature of the rotary magnetic solenoid utilized in the invention rotates through arcs of twenty-two and one-half degrees to either side of the null position. The angular displacement from the null position and the direction of displacement therefrom is controlled by the amplitude and direction, respectively, of signals to the solenoid stator. When no driving signal to the stator is present, the force of the permanent magnet in the armature centers the armature relative to the stator at the zero or null position.

In a conventional rotary servovalve for the control of fluid flow, the fluid enters the valve housing at a single inlet port and exits the valve housing from a single outlet port. Flow through the valve is controlled by the position of the movable valve element which directs flow from the inlet port to alternative outlet ports. The flow to the outlet port of the valve housing is to a fluid reservoir, which is maintained at a reduced pressure from the pressure of the fluid source. Consequently, the pressure within the flow passage through the valve leading from the high pressure fluid source is greater than pressure within the fluid valve leading to the fluid reservoir. Since the fluid flow passageway within the valve which conducts fluid from the high pressure fluid source is typically located on the opposite side of the valve from the fluid passageway that conducts fluid to the fluid reservoir, there is an imbalance in internal pressure within the valve. The high pressure imbalance within the valve produces a load on the valve element that must be overcome in order to rotate the valve element. As the requirement for torque increases, so does the mass of the components of the driving motor or rotary solenoid.

In a preferred embodiment of the present invention the force imbalance within the valve is virtually eliminated. This is achieved by providing the valve housing with a pair of inlet ports and a pair of outlet ports. The inlet ports are located on diametrically opposite sides of the valve housing from each other. Similarly, the outlet ports are located on diametrically opposite sides of the valve housing from each other. By necessity, the valve ports in each pair must be longitudinally offset from each other so as not to interfere with the other ports in the valve. Corresponding pairs of fluid control ports are likewise provided in the valve housing. The fluid control ports within each pair are similarly diametrically opposed and longitudinally offset from each other in the valve housing.

The rotary element of the valve is likewise provided with pairs of flow channels. The flow channels in each pair of flow channels are likewise diametrically opposed from each other and longitudinally offset on the movable valve element.

As a consequence, pairs of flow channels are defined in which the flow channels in each pair conduct fluid through the valve in opposite directions from each other. Therefore, the forces within the valve are balanced, regardless of the direction of fluid flow, the extent to which the ports are open, and even under no flow conditions. As a result, less torque and, therefore, less massive components in the rotary solenoid are required in order to operate the rotary valve. By reducing the mass of the rotary solenoid components, the inertia of the rotary solenoid is also reduced. Reduction in valve inertia results in an increase in the frequency bandwidth of responsiveness of the rotary solenoid to electrical input signals. An increase in frequency bandwidth produces a much faster response time of the rotary solenoid, and hence the servovalve, to electrical input signals that operate the solenoid.

In one broad aspect the present invention may be considered to be a rotary servovalve system comprising a pressurized fluid supply source, a fluid reservoir, a fluid transfer valve housing, a movable valve member located within the valve housing, a rotary magnetic solenoid having an armature and a stator that returns the armature to a null position in the absence of actuating signals, a Hall-effect sensor located proximate to the rotary magnetic solenoid, and a control circuit responsive to the Hall-effect sensor and which provides a feedback electrical signal.

The fluid reservoir has a fluid pressure lower than that of the fluid supply source. The fluid transfer valve housing has a wall of annular cross section and defines therein at least one fluid inlet port coupled to the fluid supply source. At least one fluid outlet port is also defined in the valve housing and is coupled to the fluid reservoir. The fluid outlet port is located diametrically opposite the fluid inlet port. The valve housing also defines at least one first fluid control port and at least one second fluid control port. The first and second fluid control ports are located diametrically opposite each other and equidistant from the inlet and outlet ports.

The movable valve member is located within the valve housing and is alternatively rotatable in opposite angular directions. The movable valve element is rotatable from a closed position in which flow through all of the ports is blocked to positions in which each of the first and second fluid control ports alternatively permits flow therethrough from the fluid inlet port while the other of the first and second fluid control ports concurrently permits flow therethrough to the reservoir.

The stator of the rotary magnetic solenoid is electronically activated. The armature of the rotary magnetic solenoid has at least one permanent magnet thereon. The armature is alternatively rotatable relative to the stator in opposing angular directions from a null position. The permanent magnet returns the armature to the null position when the stator is deactuated. The armature drives the movable valve member so that the movable valve member is in its closed position when the armature is in its null position.

The Hall-effect sensor is located proximate to the rotary magnetic solenoid to provide a feedback signal indicative of the position and direction of rotation of the armature relative to the null position. The control circuit, which is responsive to the Hall-effect sensor, provides a feedback electrical signal to the stator. This feedback electrical signal drives the movable valve member to a target angular orientation relative to the valve housing. This target orientation is determined by an externally generated command signal.

One very important aspect of the invention resides in the control circuit. The control circuit provides a correction signal to the stator that is proportional to the feedback signal over a broad frequency range. A conventional rotary actuator, such as that described in U.S. Pat. No. 5,337,030, has a uniform frequency response over a bandwidth of only about sixty hertz. By employing the control circuitry of the invention, the bandwidth at which the correction signal to the stator is proportional to the feedback signal is increased to a range of at least about one hundred twenty hertz. This increase in frequency responsive bandwidth means that the action of the valve in directing fluid flow is much quicker than in conventional servovalve systems.

To a large extent the improved bandwidth of responsiveness of the servovalve system is attributable to the components of the control circuit. Specifically, the control circuit includes a comparator circuit and an error signal processing circuit that includes a proportional amplifier circuit, a differential amplifier circuit, and an integral amplifier circuit, each of which provides a separate output. The comparator circuit receives the feedback signal from the Hall-effect sensor and also an externally generated command signal. The comparator provides an error signal representing the difference between the feedback signal and the command signal. The error signal processing circuit provides separate outputs from the proportional amplifier circuit, the differential amplifier circuit, and the integral amplifier circuit. The combining circuit receives these outputs to produce a frequency-compensated error signal proportional to the difference between the feedback signal and the command signal over a frequency range of at least about one hundred twenty hertz.

Preferably, the control circuit is comprised of an absolute value amplifier circuit and a polarity-indicating amplifier circuit. The absolute value amplifier circuit is coupled to the combining circuit and has an absolute value error output signal proportional to the amplitude of the frequency-compensated error signal irrespective of the polarity thereof. The polarity-indicating amplifier circuit is also coupled to the combining circuit and produces an output indicative of the polarity of the frequency-compensated error signal. A current flow regulation circuit drives the stator of the rotary magnetic solenoid to cause the armature to rotate in an angular direction which is determined by the polarity-indicating amplifier circuit to an angle of displacement from the null position which is determined by the absolute value amplifier circuit.

As previously indicated, the valve housing is preferably comprised of a pair of inlet ports and a pair of outlet ports, as well as a pair of first fluid control ports and a pair of second fluid control ports. The ports within each pair of ports are located one hundred eighty degrees apart, diametrically opposite, and longitudinally offset from each other in the housing. The use of duplicate ports arranged to exert opposing force virtually eliminates pressure imbalances within the valve, thus allowing lighter weight, less massive components to be utilized in the rotary solenoid actuator. By employing a frequency-compensating conditioning circuit in the electrical control for the rotary solenoid, the bandwidth of operation of the servovalve system is improved significantly. The response time of the actuator is thereby improved.

Preferably also, a coupling member is employed to join the solenoid armature to the movable valve member. The rotary magnetic solenoid and the movable valve member are axially aligned with and longitudinally displaced from each other. The coupling member joins the rotary drive shaft of the rotary solenoid armature to the valve stem of the movable valve member. It has been found that by utilizing a coupling member, rather than joining the armature shaft directly to the rotary valve stem, the movable valve element is less likely to bind within the valve housing. When binding occurs the precision of control of the rotation of the movable valve member is adversely effected.

In another aspect the invention may be considered to be a rotary servovalve system comprising a pressurized fluid supply, a fluid reservoir, a valve housing, a bidirectional valve closure element, and a rotary solenoid having a stator and an armature rotatable within the stator between two extreme positions and biased toward a null position midway between the two extreme positions by the force of a permanent magnet on the armature. The pressurized fluid supply has a pressure supply line leading therefrom while the fluid reservoir has a fluid relief line leading thereto. The valve housing has a valve cavity of circular cross section defined therewithin. The valve housing defines at least one rectangular inlet port to the valve cavity that is coupled to the pressure supply line, and at least one rectangular outlet port from the valve cavity coupled to the relief line and located diametrically opposite to the inlet port. The valve housing further defines at least one first rectangular fluid control port and at least one second rectangular fluid control port in communication with the valve cavity and located diametrically opposite each other and equidistant from the inlet and outlet ports.

The bidirectional valve closure element has a gate portion with at least one pair of mutually parallel, longitudinally oriented and longitudinally aligned, flow-directing faces of rectangular shape. The valve closure element is located within the valve cavity and is coaxially aligned and rotatable therewithin. The valve closure element is rotatable to create concurrent flow paths between the first fluid control port and the inlet port and between the second fluid control port and the outlet port. The bidirectional valve closure element is rotatable alternatively to block all of the ports. Alternatively still, the valve closure element can be rotated to create concurrent flow paths between the second fluid control port and the inlet port and between the first fluid control port and the outlet port.

The rotary solenoid has a stator and an armature with a permanent magnet rotatable within the stator. The armature is rotatable between two extreme positions and is biased toward a null position midway between the two extreme positions by the magnetic force from the permanent magnet. The armature is joined to the valve closure element so that when the armature is at the null position the valve closure element blocks all of the ports, namely the inlet port, the outlet port and the first and second fluid control ports.

The invention may also be considered to be an improvement in a rotary servovalve system in which fluid is directed through at least one inlet port, at least one outlet port, at least one first fluid control port, and at least one second fluid control port in a valve housing. The flow of fluid is directed by a movable valve gate element that is rotatable within the housing in opposite directions of angular rotation from a position prohibiting fluid flow through any of the ports. The valve gate element is rotatable to alternative positions permitting fluid flow in alternative, opposite directions through each of the first and second fluid control ports.

The improvement of the invention is comprised of a rotary magnetic solenoid having an armature that includes at least one permanent magnet. The armature is rotatable relative to a stator formed as an electromagnet that is energizable to alternatively create electromagnetic fields having opposite polarities from each other. The stator, when deenergized, allows the armature to return to a neutral, null position from positions of orientation in opposite angular directions. The armature is coupled to carry the movable valve gate element in angular rotation therewith.

A Hall-effect sensor is located proximate to the rotary magnetic solenoid. The Hall-effect sensor senses the position of the solenoid armature relative to the stator and provides a feedback signal responsive thereto. A control circuit is coupled between the Hall-effect sensor and the rotary magnetic solenoid to provide control inputs to the stator of the rotary magnetic solenoid.

The electrical control circuitry employed in the rotary servovalve system of the invention is simple and inexpensive to implement and employs conventional, commercially available components. These components are arranged in a unique, yet simple and straight forward manner.

The rotary servovalve system of the invention may be utilized with either pneumatic or hydraulic fluids. In either case, the system precisely controls position, velocity, and acceleration of a mechanical load, such as movement of a piston within a cylinder.

The fluid control valve employed in the servovalve system of the invention has large orifices that are controlled by a small electromagnetic rotary solenoid. Valves constructed according to the invention are quite capable of providing pneumatic flow rates in excess of thirty standard cubic feet per minute and are designed to withstand high stress loads. The system features high torque operation and is capable of operating for millions of cycles.

The servovalve system of the invention has a system bandwidth that is operational over one hundred twenty hertz due to the unique closed loop rotary servovalve and control system design. The rotary servovalve system of the invention is useful in a wide variety of applications. For example, many applications for the system of the invention exist in the automotive industry, as well as the aerospace industry. The system is useful in electronics for medical equipment and with home appliances. It can be used for controlling manufacturing equipment and machines and is also useful in the marine industry. The servovalve system of the invention also has significant utility in the computer industry. Its small size and rapid response to signals over a broad bandwidth make the system particularly useful for flight simulators, both for FAA and PC games applications. The servovalve system of the invention also has significant applications for use in entertainment and theme parks.

The invention may be described with greater clarity and particularity by reference to the accompanying drawings.

DESCRIPTION OF THE DRAWINGS

FIG. 2 is a perspective view showing the mechanical components of FIG. 1 assembled together.

FIG. 3 is a sectional elevational view taken along the lines 3—3 of FIG. 2.

FIG. 4 is a sectional elevational view of the valve housing of FIG. 1 shown in isolation.

FIG. 5 is a sectional elevational view of the movable valve gate element of FIG. 1, shown in isolation.

FIG. 15 is a diagrammatic view illustrating the fluid passageway interconnections of the valve of FIG. 14 with all ports blocked.

FIG. 16 is a diagrammatic view illustrating the fluid passageway interconnections of the valve of FIG. 14 responsive to actuation of the rotary magnetic solenoid shown in FIG. 1 in one direction of operation.

FIG. 17 is a diagrammatic view illustrating the fluid passageway interconnections of the valve of FIG. 14 responsive to actuation of the rotary magnetic solenoid shown in FIG. 1 in a direction opposite to that shown in FIG. 16.

DESCRIPTION OF THE EMBODIMENTS

Figure 10:
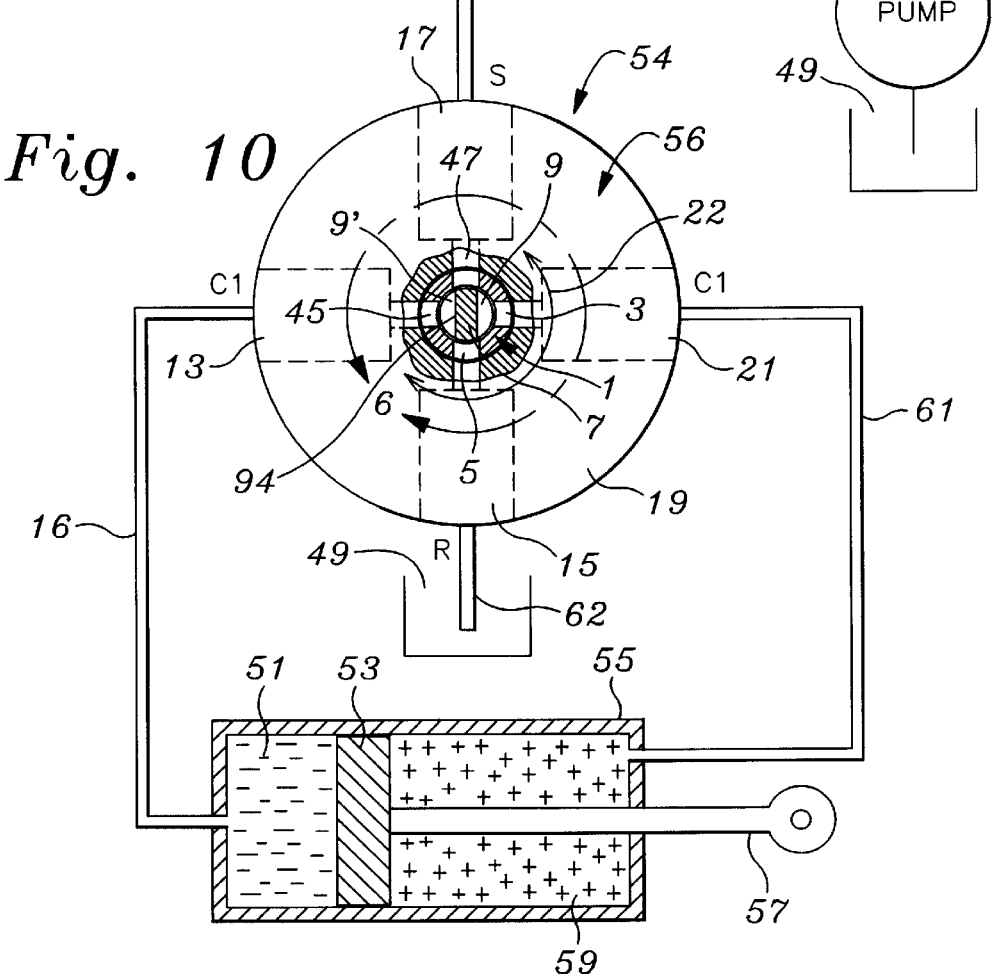
FIG. 10 is diagrammatic view illustrating the mechanical components of the rotary servovalve system of the invention with a partial section taken along the lines 9—9 of FIG. 3 showing all valve ports closed.
Figure 11:
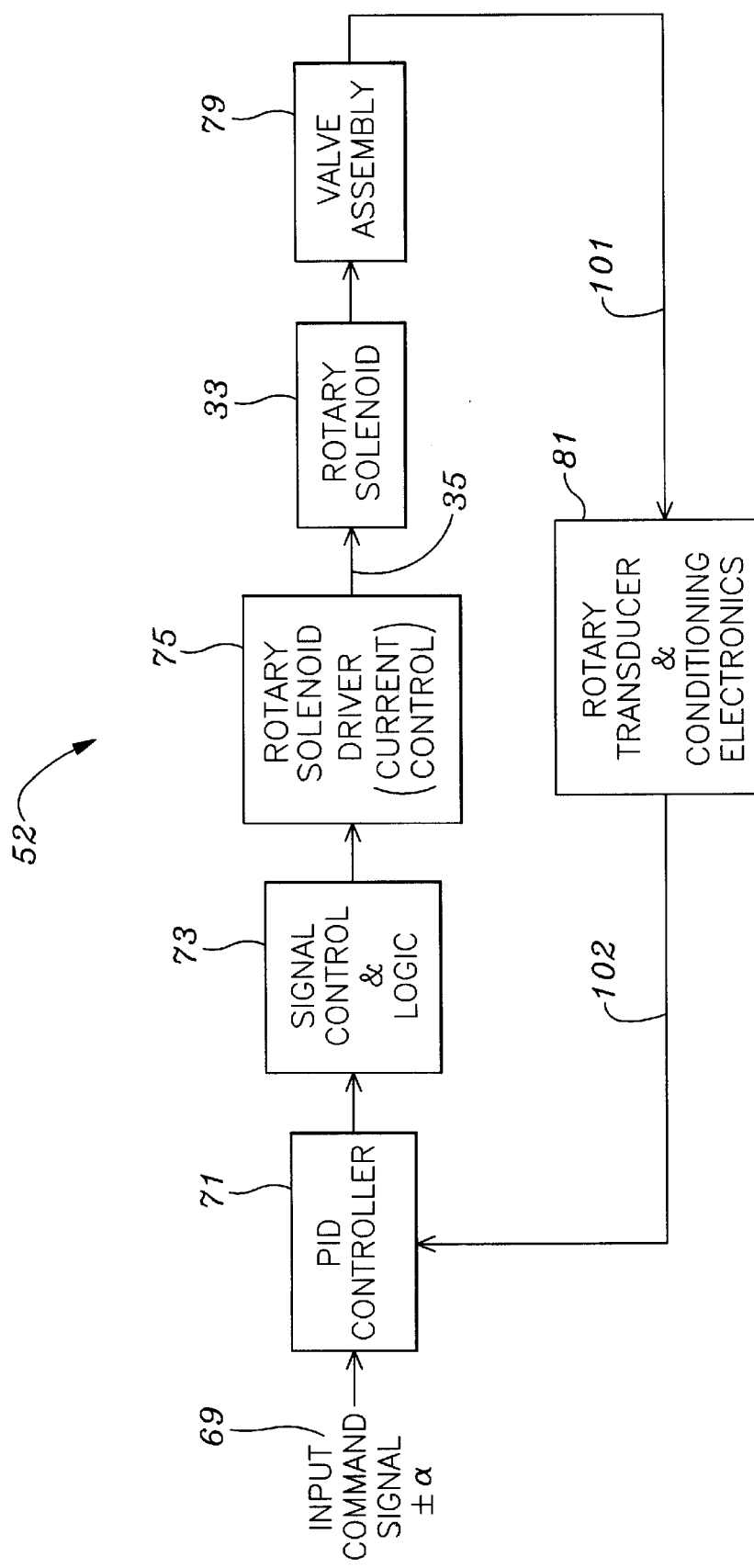
FIG. 11 is a electrical block diagram illustrating an electrical control circuit coupled to the mechanical components of the rotary servovalve system illustrated in FIG. 10.

FIGS. 10 and 11 provide an overview of a rotary servovalve system according to the invention. This system includes a mechanical section 50, illustrated generally in FIG. 10, and an electrical control circuit 52, illustrated in block diagram form in FIG. 11.

Figure 1:
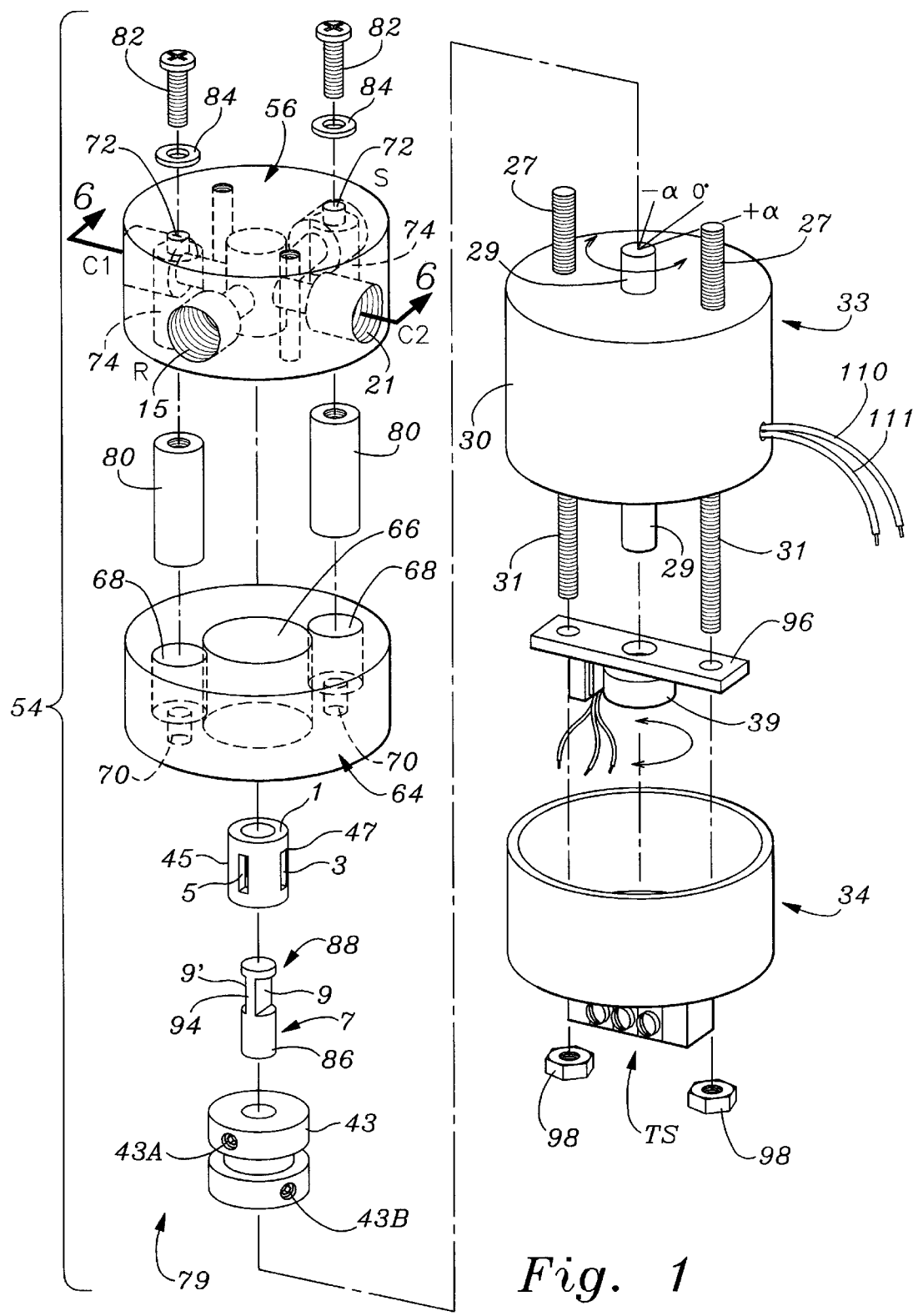
FIG. 1 is an exploded perspective view illustrating the mechanical components of a first embodiment of a rotary servovalve system according to the invention.
Figure 6:
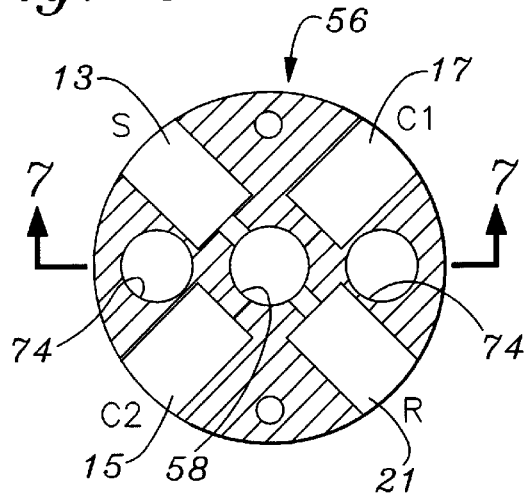
FIG. 6 is a sectional plan view of the valve housing cap taken along the lines 6—6 of FIG. 1.
Figure 7:
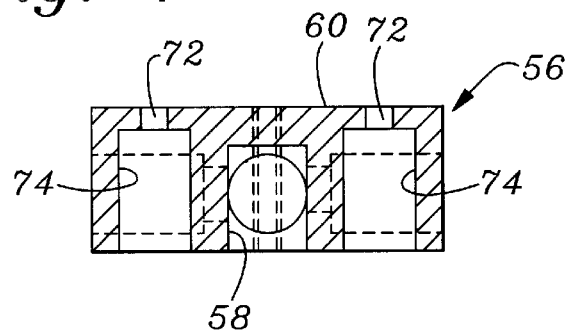
FIG. 7 is a sectional view taken along the lines 7—7 of FIG. 6.

The mechanical section 50 of the rotary servovalve system of the invention has a valve and solenoid assembly 54 operated through signals from the control circuit 52 that are connected by appropriate wires to a terminal strip TS, illustrated in FIGS. 1–3. The rotary servovalve and solenoid assembly 54 includes an Ultramag® rotary actuator 33 that is seated in a hollow, cup-shaped end cap 34. The end cap 34 has a cylindrical, annular wall open at its upper end to receive the rotary magnetic solenoid 33 and is closed at its lower end. The terminal strip TS is located externally on the lower, closed end of the hollow cap 34.

The rotary magnetic solenoid actuator 33 is of the type that includes an armature with at least one permanent magnet thereon, described in U.S. Pat. No. 5,337,030, which is incorporated herein in its entirety by reference. Different sizes of rotary magnetic solenoid actuators 33 are commercially available as the Ultramag® Series Rotary Actuators, sold by Lucas Control System Products, Lodex Actuation Products, 800 Scholz Drive, Vandalia, Ohio 45377-0427. While the embodiments of the invention described herein envision use of the size model 4EM/4EMM, larger systems might employ size models 5EM/5EMM or 6EM/6EMM.

The valve portion of the rotary servovalve system of the invention is located opposite the end cap 34 at the upper end of the servovalve and rotary magnetic solenoid assembly 54. Specifically, the valve portion of the assembly 54 includes an upper fluid transfer valve housing cap 56. The valve housing cap 56 defines a fluid inlet port 17 coupled to a fluid supply source which may be a pump 65 that supplies fluid under pressure through a supply line 67 connected to the inlet port 17 from a fluid reservoir 49, as shown in FIG. 10. The fluid reservoir 49 is at a fluid pressure lower than that of the output of the fluid pump 65. The fluid reservoir 49 is also connected directly to a relief port 15 in the valve housing cap 56 by a fluid return line 62.

The fluid transfer valve housing cap 56 also has a first fluid control port 13 and a second fluid control port 21. The first fluid control port 13 is connected by a conduit 16 to the blind end 51 of a hydraulic actuator cylinder 55. The opposite end 59 of the hydraulic actuator cylinder 55 has a central, axial opening therein through which a piston rod 57 extends. A conventional sliding seal (not shown) about the piston rod 57 maintains pressure within the actuator cylinder end 59. The piston rod 57 is connected to a piston 53 which moves reciprocally within the actuator cylinder 55 in sliding, sealed engagement with the interior cylindrical wall thereof in a conventional manner.

The valve housing cap 56 has a cylindrical inner wall 58. The upper end 60 of the valve housing cap 56 is closed so that the central, cylindrical interior wall 58 defined within the cap 56 forms a blind well or bore closed at the top and open at the bottom. A pair of diametrically opposed, longitudinally extending cylindrical bores 72 are defined in the closed, upper end 60 of the valve housing cap 56 at locations located radially outwardly from the central inner cylindrical wall 58 in diametric opposition from each other. A pair of larger diameter cylindrical bores 74 are defined in the downwardly facing, annular surface of the cap 56 in coaxial alignment with the bores 72.

The valve housing portion of the assembly 54 also includes an annular, intermediate housing ring 64 having a central, cylindrical inner wall 66. Radially outwardly from the cylindrical inner wall 66 there are a pair of diametrically opposed cylindrical bores 68 that extend down into the intermediate ring 64 from the upper surface thereof. The bores 68 are of the same diameter as the bores 74 in the valve housing cap 56 and are coaxially aligned therewith. A pair of narrower cylindrical bores 70 are defined in the lower surface of the intermediate ring 64 and extend upwardly in coaxial alignment to intersect the larger diameter bores 68.

The valve and solenoid assembly 54 further includes a pair of cylindrical, annular, elongated metal bushings 80 which have smooth outer surfaces and which are internally tapped. The outer diameter of the bushings 80 is such that they fit snugly into both the bores 74 in the under surface of the valve housing cap 56 and into the bores 68 in the upper surface of the intermediate housing ring 64.

The rotary servovalve system of the invention also includes a valve housing sleeve 1 of cylindrical annular configuration. The outer diameter of the housing sleeve 1 is such that it can be press fitted into the cylindrical wall 58 of the central axial blind bore in the valve housing cap 56. The valve housing sleeve 1 is formed of hardened steel and contains four longitudinally elongated, precision, rectangular-shaped fluid passageways or openings 3, 5, 45, and 47. An EDM (electrical discharge machine) process forms the four rectangular fluid orifices 3, 5, 45, and 47 radially through the cylindrical annular walls of the sleeve 1. The inlet orifice 47 and outlet orifice 5 are located diametrically opposite to each other in the sleeve 1. Likewise, the first fluid control orifice 45 and the second fluid control orifice 3 are likewise located diametrically opposite each other. The first and second control orifices 45 and 3 are both located equidistant from the inlet orifice 47 and from the outlet orifice 5. All of the rectangular orifices 3, 5, 45, and 47 have the same rectangular dimensions and are all longitudinally aligned with each other and angularly located at ninety-degree intervals about the sleeve 1. The elongated, rectangular valve openings 3, 5, 45, and 47 in the interior valve housing sleeve 1 are respectively longitudinally and radially aligned with the valve ports 21, 15, 13, and 17 in the valve housing cap 56.

The servovalve of the invention also includes a bidirectional, rotatable valve gate element 7 that is located radially within the valve housing sleeve 1. The rotatable valve gate element 7 has a generally cylindrical configuration, the lower end 86 of which is formed as a cylindrical valve stem and the upper end 88 of which forms a gate portion of the valve gate element 7. The gate portion 88 of the movable valve gate element 7 is formed with a set of mutually parallel, longitudinally oriented, rectangular-shaped, flow-directing faces 9 and 9'. The flow-directing faces 9 and 9' are oriented in mutually parallel alignment with each other and parallel to and equidistant from the axis of rotation of the movable valve gate element 7, which is indicated at 90 in FIG. 5.

The flow-directing faces 9 and 9' are formed by milling out notches or slots from diametrically opposites sides of the upper end of the movable valve gate element 7 so that the transverse ledge surfaces 92 above and beneath the flow-directing faces 9 and 9' all reside in planes perpendicular to the axis of rotation 90. All of the circular segment-shaped ledges 92 are equal to each other in surface area and in distance from the axis of rotation 90.

The structure of the movable valve gate element 7 remaining between the flow-directing faces 9 and 9' may be considered to be a web 94. The diametrically opposing, outwardly facing, curved surfaces of the web 94 are of a slightly greater width than the width of the elongated, rectangular openings 3, 5, 45, and 47 in the valve housing sleeve 1 in order to minimize valve overlap.

The upper, gate portion 88 of the rotatable valve member is inserted up into the central, cylindrical opening in the housing sleeve 1 until the web 94 resides in longitudinal alignment with the port openings 3, 5, 45, and 47. The lower, valve stem end 86 of the rotatable valve gate element 7 extends downwardly beneath the housing sleeve 1. The valve stem end 86 is received within a central, axial opening in a spool-shaped intermediate coupler 43 and is immobilized from rotation relative thereto by a radial set screw 43A in the upper portion of the coupler 43.

The coupler 43 is preferably a Schmidt Control Flex Coupling, part no. C008P, manufactured by Zero-Max. The coupler 43 has sufficient flexibility to prevent any binding of the movable valve elements within the valve housing sleeve 1, yet ensures that the moveable valve gate element 7 is locked in rotational movement to the rotary solenoid armature shaft 29.

Figure 8:
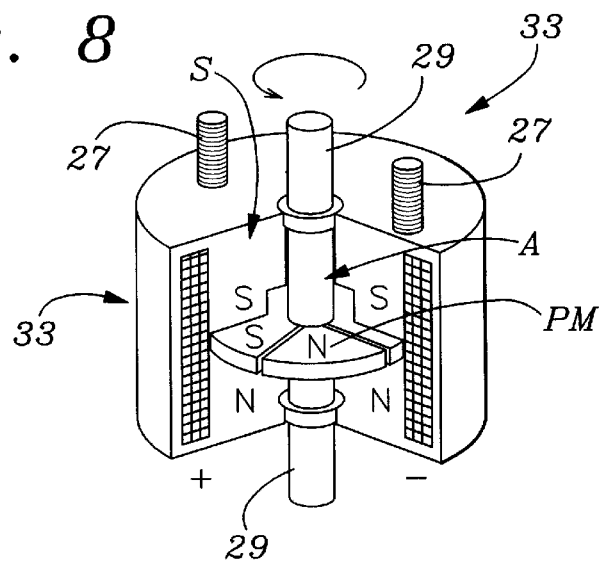
FIG. 8 is a perspective diagram, partially broken away, showing the internal operating components of the rotary solenoid shown in FIG. 1.

The internal construction and operation of the rotary solenoid 33 is shown in FIG. 8. The rotary solenoid 33 operates on the principle of attraction and repulsion of opposite and like magnetic poles. The permanent magnetic armature A has permanent magnets PM that together have twice as many poles as the solenoid stator S. In the deenergized state, the armature poles each share half a stator pole, causing the shaft to seek midstroke. When power is applied, the stator poles are polarized. This attracts half and repels the other half of the armature poles, causing the shaft to rotate. When the voltage is reversed, the stator poles are polarized with the opposite magnetic pole. Consequently the opposite poles of the armature A are attracted and repelled, thus causing rotation in the opposite direction. FIG. 8 illustrates rotation of the armature in a counterclockwise direction relative to the stator S, as viewed from the top.

The solenoid armature A of the rotary solenoid 33 has a central, axial drive shaft 29 including an upper portion that extends upwardly out of the casing 30 of the rotary solenoid 33, and a lower portion that extends downwardly therefrom. The diameter of the rotary solenoid drive shaft 29 is the same as that of the valve stem 86, so that the upper portion of the drive shaft 29 of the rotary solenoid 33 fits snugly into the central axial opening in the coupler 43. A lower set screw 43B immobilizes the coupler 43 relative to the solenoid drive shaft 29. The intermediate coupler 43 thereby joins the armature drive shaft 29 to the movable valve gate element 7. The rotary magnetic solenoid 33 and the movable valve gate element 7 are thereby axially aligned with and longitudinally displaced from each other.

The rotary magnetic solenoid 33 has a pair of upwardly projecting, externally threaded mounting studs 27 and a pair of downwardly projecting, externally threaded mounting studs 31 that are rigidly attached to and extend longitudinally from the solenoid case 30. To assemble the valve and solenoid assembly 54 the upper mounting studs 27 of the rotary solenoid 33 are inserted up into the openings 70 in the intermediate housing ring 64. This brings the coupler 43 into the opening 66 in the intermediate housing ring 64 with the movable valve gate element 7 projecting upwardly above the intermediate housing ring 64. The internally threaded bushings 80 are then rotated and threaded onto the upwardly projecting rotary solenoid mounting studs 27 and tightened down into the bores 68 of the intermediate housing ring 64. The bores 68 thereby serve as seating sockets for the lower ends of the bushings 80.

The intermediate housing ring 64 is then moved upwardly, thereby seating the upper ends of the elongated bushings 80 into the bores 74 that also serve as seating sockets and which are defined in the underside of the housing cap 56. When the underside of the housing cap 56 makes contact with the upper surface of the intermediate housing ring 64, the gate portion 88 of the rotatable valve gate element 7 resides in longitudinal alignment with the rectangular openings 3, 5, 45, and 47 in the housing sleeve 1.

The assembly 54 further includes a pair of valve cap connecting bolts 82, each of which has a washer 84. The bolts 82 are inserted through the washers 84 and down into the openings 72 defined in the upper end 60 of the valve housing cap 56. The bolts 82 are advanced into engagement with the upper ends of the elongated bushings 80. The threaded shanks of the cap-connecting bolts 82 extend downwardly through the bores 72. The cap bolts 82 are tightened down into the elongated bushings 80, which are seated in the bores 74, thereby securing the valve housing cap 56 tightly in fluid-tight sealing relationship with the intermediate housing ring 64.

The casing 30 of the rotary solenoid 33, the intermediate housing ring 64, and the housing cap 56 are thereby securely fastened to each other. The fit of the movable valve gate element 7 against the internal cylindrical wall of the housing sleeve 1 is sufficiently close so that a fluid-tight seal is established therebetween. Fluid flow through the valve can therefore occur only if the flow directing faces 9 and 9' of the valve gate portion 88 are rotated in such a way as to permit flow to or from the rectangular openings 3, 5, 45, and 47 in the housing sleeve 1. The movable valve gate element 7 and the upper end of the drive shaft 29 from the armature A of the rotary solenoid 33 are coaxially aligned with each other and are longitudinally offset from each other. The annular coupling member 43 is secured to both the valve gate element 7 and to the upper end of the armature shaft 29.

Figure 12:
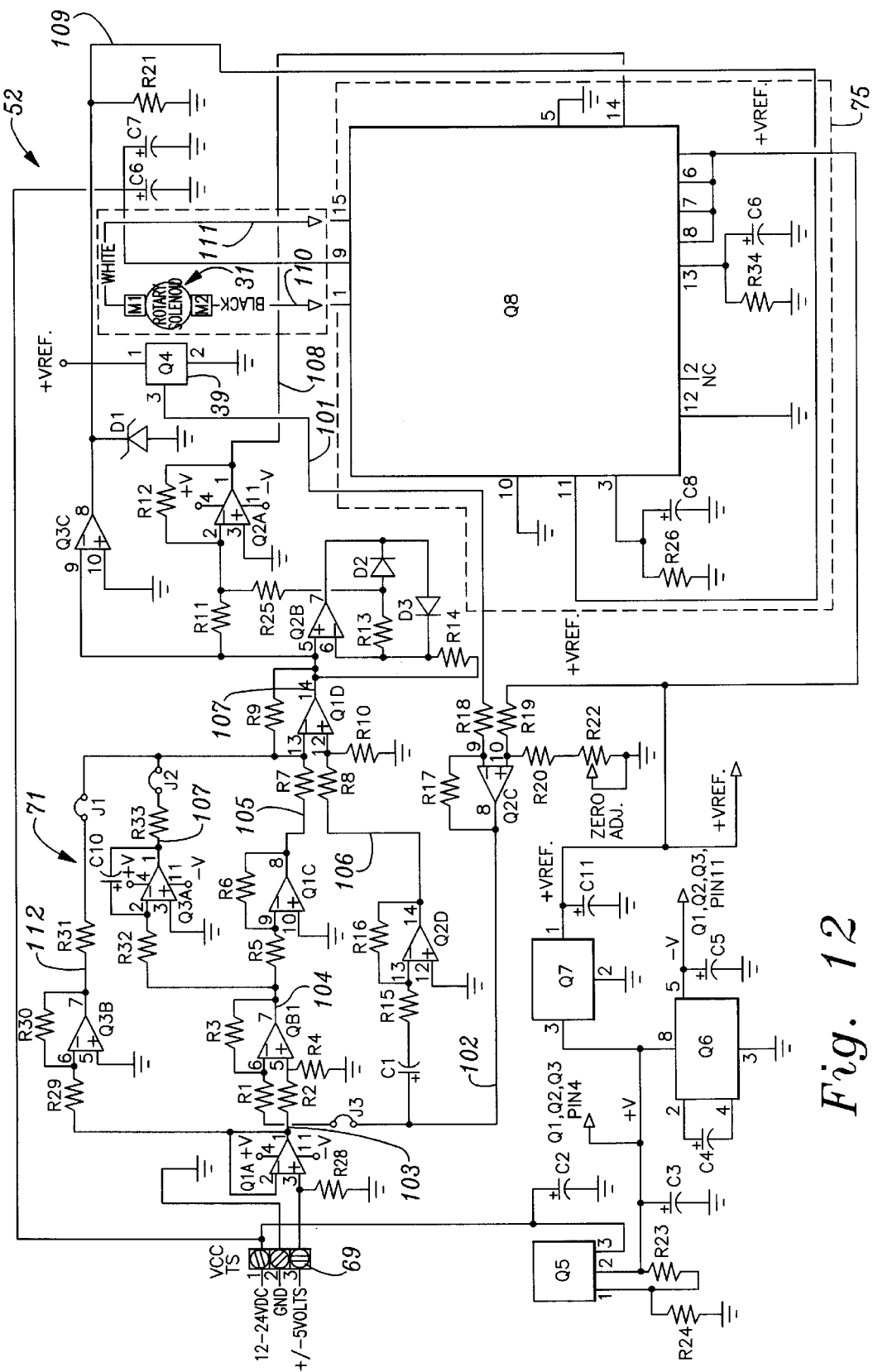
FIG. 12 is a schematic diagram illustrating the electrical control system of FIG. 11 in greater detail.

The lower end of the armature shaft 29 projects downwardly from the bottom of the rotary solenoid housing 30 and into an annular Hall-effect position transducer 39 that is located proximate to the rotary solenoid 33. The position transducer 39 detects the direction and extent of angular rotation of the shaft 29 of the solenoid armature A from a null position, indicated at 0° in FIGS. 1 and 9. The Hall-effect position transducer 39 is a magnetic sensor which provides a feedback signal 101, as indicated in FIGS. 11 and 12. The feedback signal 101 is indicative of the position and direction of rotation of the armature A and armature shaft 29 relative to the null position of 0°.

The Hall-effect position transducer 39 is attached to a flat, transverse bar 96 which has openings at its ends through which the lower rotary solenoid mounting studs 31 project. The mounting bracket 96 resides in contact with the underside of the rotary solenoid casing 30, and the lower mounting studs 31 project downwardly therethrough and through openings in the cup-shaped rotary solenoid housing end cap 34. Fastening nuts 98 are threaded onto the exposed ends of the lower mounting studs 31 that project downwardly through the bottom of the rotary solenoid end cap 34. The nuts 98 are tightened so that the upper, annular edge of the end cap 34 bears against the periphery of the underside of the rotary solenoid casing 30, as illustrated in FIG. 3.

With all of the component parts of the servomotor and rotary valve assembly 54 assembled and tightened together as illustrated in FIGS. 2 and 3, the assembly 54 is connected in the rotary servovalve system 50 as shown in FIG. 10. Fluid flow from the pump 65 is controlled by the rotatable valve gate element 7 to allow or block fluid flow as illustrated, for example, in FIGS. 9 and 10.

Specifically, the armature shaft 29 is rigidly coupled to the rotatable valve gate element 7 by means of the coupler 43, so that the rotatable valve gate element 7 rotates through the same angle as the armature shaft 29 in response to driving inputs to the rotary solenoid 33. As is evident from FIGS. 8 and 9, the armature A of the rotary magnetic solenoid 33 is alternatively rotatable relative to the stator S of the rotary magnetic solenoid 33 in opposing angular directions from a null position of 0°.

As illustrated, the armature A of the rotary solenoid 33 drives the movable valve gate element 7 so that the movable valve gate element 7 is in the closed position depicted in FIG. 10 when the armature A is in the null position of 0° indicated in FIG. 10. The armature A and its shaft 29 are rotatable within the stator S of the rotary magnetic solenoid 33 between two extreme positions indicated at $+\alpha$ and $-\alpha$ in FIGS. 1 and 9. The armature A is biased toward the null position, 0°, midway between the two extreme positions $+\alpha$ and $-\alpha$ by the forces of the permanent magnets PM on the armature A. The permanent magnets PM in the armature A of the rotary solenoid 33 return the armature A to the null position as described in U.S. Pat. No. 5,337,030. The armature shaft 29 is joined to the valve gate element 7 so that when the armature A is at the null position of 0°, the valve gate element 7 is also at the null position of 0° indicated in FIG. 9. The valve web 94 then blocks flow into or out of all of the ports 13, 15, 17, and 21, as illustrated in FIG. 10, when the feedback signal 101 is zero.

Figure 9:
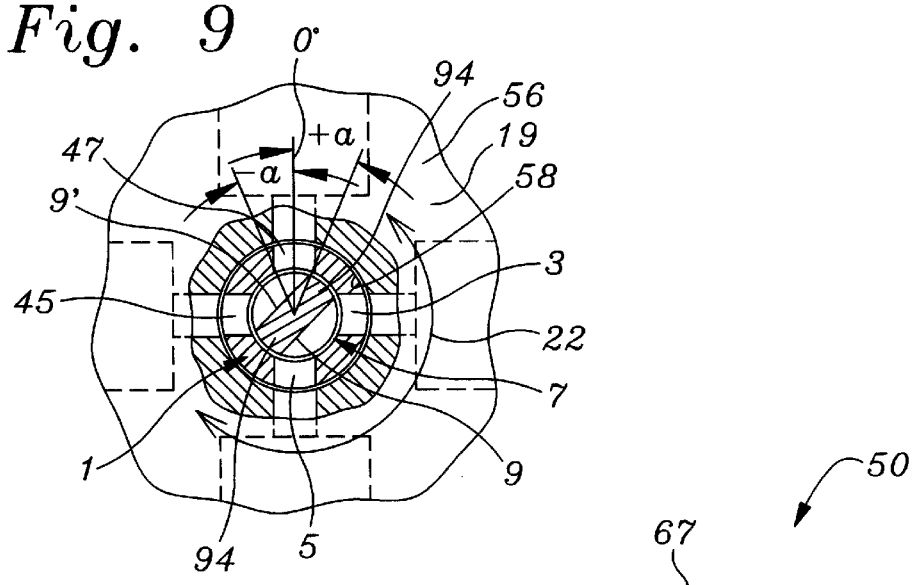
FIG. 9 is a transverse sectional detail taken along the lines 9—9 of FIG. 3 showing the valve of the invention in a position to conduct fluid from a pressure supply line through a first fluid control port and to concurrently conduct fluid from a second fluid control port to a fluid relief line.

With reference to FIG. 10, the servovalve and rotary solenoid assembly 54 is connected in the mechanical section 50 of the rotary servovalve system of the invention in the same manner as a conventional four-way servovalve or proportional valve. That is, fluid flow from the pump 65 is controlled by the movable valve gate element 7. When the valve gate element 7 is rotated clockwise, as shown in FIG. 9, the rotary servovalve and solenoid assembly 54 allows flow from the supply line 67 to the first fluid control port 13 and on through line 16 to the blind end 51 of the hydraulic actuator cylinder 55. The valve gate element 7 concurrently allows flow from the cylinder cavity 59 through line 61, through the second fluid control port 21 to the fluid return line 62 leading to the fluid reservoir 49. This fluid flow occurs when and to the extent that the web 94 of the rotary valve gate element 7 is rotated clockwise by the rotary solenoid armature shaft 29 from the null position, 0°, toward a maximum, extreme clockwise position of rotation indicated by $+\alpha$ in FIG. 9.

Conversely, if the web 94 is rotated in a counterclockwise direction by counterclockwise rotation of the rotary magnetic solenoid 33 is illustrated in FIG. 8 from the null position, 0°, as viewed in FIGS. 9 and 10, toward an extreme counterclockwise position of rotation indicated at $-\alpha$ in FIGS. 1 and 9, flow is from the inlet port 17 through the second fluid control port 21 to the cylinder cavity 59, with concurrent flow from the cylinder cavity 51 through the first fluid transfer port 13 to the outlet port 15, return line 62, and reservoir 49.

The maximum angle $\alpha$ in both direction is twenty-two and a half degrees, as shown in FIG. 9. Since the valve openings 3, 5, 45, and 47 are rectangular, and since the extent to which the web 94 blocks or unblocks these openings is throughout their entire lengths, the window through which flow passes to or from the valve openings 3, 5, 45, and 47 past the flow-directing faces 9 and 9' is always of a rectangular shape. Consequently, the volume of flow through both sides of the rotary servovalve varies linearly with the angle of rotation of the armature shaft 29.

Rotation of the valve gate element 7 is controlled through an angle of between +α and −α degrees from a zero null position of 0° by electronic control circuitry as shown in FIGS. 11 and 12. The armature shaft 29 is precisely rotated in either of two alternative directions by the application of an electrical power control signal 35, indicated in FIG. 11.

The rotation of the rotatable valve gate element 7 is controlled precisely and at a high bandwidth with a proportional, integral, and derivative (PID) electronic control system in the rotary transducer and conditioning electronics indicated generally at 81 in FIG. 11. The angle of the shaft 29 is sensed with the Hall-effect sensor 39 that transforms the magnetic field created by permanent magnets PM of the armature A attached to the shaft 29 into a voltage feedback signal 101.

A command voltage 69 that is applied to the input of the PID control system 71 is compared to the conditioned feedback voltage signal 102 from the rotary transducer and conditioning electronics 81 and converted into a current in the rotary solenoid 33. The feedback control system of the PID controller 71 quickly drives the difference between the input command signal 69 and the conditioned feedback signal 102 to zero by the application of electrical current to the rotary solenoid 33 through the wires 110 and 111, shown in FIG. 2. 1 and 12. When electrical control power signals 35 are removed or when a zero command signal 69 is applied to the electronic control system 52, the armature shaft 29, shown in FIG. 1, returns to the null position through the actions of the permanent magnetic restoring forces internal to the rotary solenoid 33.

As illustrated in FIG. 10, the fluid conduit 67 conducts high-pressure fluid flow produced by the pump 65 to the fluid supply inlet port 17 and orifice 47. FIG. 10 depicts the movable valve gate element 7 positioned in a null or fluid flow blocking position, thus preventing fluid entry into the cavities created within the housing sleeve 1 by the flow directing faces 9 and 9'. At the same time, fluid flow through the orifice 5 is also blocked, thus preventing fluid from returning to the reservoir 49 through the outlet port 15. Fluid flow to or from the first fluid transfer port 13 and the second fluid transfer port 21 is also blocked, as there is no path of flow through either of these ports by way of the orifices 45 and 3, respectfully.

The substantially rectangular shape of the web 94 of the gate portion 88 of the movable valve element 7 inherently produces large tangential Bernoulli reaction forces when fluid flows past the flow directing faces 9 and 9'. These Bernoulli forces tend to drive the web 94 of the movable valve element 7 toward the closed or null position, as illustrated in FIG. 10. This null position is indicated at 0° in FIG. 9.

FIG. 12 is a schematic electrical diagram of the control circuit 52 of the invention. The control circuit 52 is responsive to the Hall-effect sensor 39, which includes an operative electronic component indicted at Q4 in FIG. 12. The sensor element Q4 of the sensor 39 may be a UGN3516 Hall-effect transducer manufactured by Allegro. The Hall-effect sensor 39 is located proximate to the rotary magnetic solenoid 33 and senses the position of the solenoid armature A relative to the stator S as indicated by the position of the armature shaft 29, and provides a feedback electrical signal 101 responsive thereto. The electrical position feedback signal 101 is indicative of the orientation of the armature shaft 29 within the angular range of +α and −α. The signal 101 moves the movable valve gate element 7 to a target angular orientation within the range +α and −α with respect to the null point, 0°, relative to the valve housing sleeve 1.

The feedback signal 101 is fed to a conditioning operational amplifier Q2C, which is configured as an inverting amplifier. A variable resistor R22 biases the signals from the Hall-effect transducer Q4 to a zero output to subtract out the direct current component of the feedback signal 101. The conditioned feedback signal is transmitted from the operational amplifier Q2C as a signal 102 to the negative side of an error-sensing circuit including an error-sensing operational amplifier QB1.

A position command signal 69 is provided from a command signal source and appears at pin3 of the terminal strip TS, shown in FIG. 12. The externally generated command signal 69 from terminal strip TS is directed to the positive side of a buffer amplifier Q1A. The output signal 103 from the buffer amplifier Q1A is connected to the positive side of the error-sensing amplifier QB1. The error-sensing amplifier QB1 is the operative component of a comparator that receives the position feedback signal 102 and the position command signal 103. The comparator circuit with amplifier QB1 compares the conditioned feedback signal 102 with the buffered command signal 103 to provide an error signal 104 in accordance with the different therebetween. The error signal 104 represents the difference between the feedback signal 102 and the unbuffered command signal 103.

The error signal 104 is directed to an error signal processing circuit which is the PID controller circuit 71, indicated in FIG. 11. An HR Textron model EC250GP General Purpose PID Control Card provides all of the components necessary for the PID controller 71. The error signal processing circuit 71 includes a proportional amplifier circuit including, as an operative component, the linearly proportional amplifier Q1C; a differential amplifier circuit including, as an operative component, the differential amplifier Q2D; an integral amplifier circuit including, as an operative component, the integral amplifier Q3A; and a feed forward signal biasing amplifier Q3B. Each of the amplifiers, Q1C, Q2D, Q3B, and Q3A provides a separate output. These outputs appear, respectively, at 105, 106, 112, and 107 in FIG. 12.

The error signal processing circuit 71 is formed of frequency-sensitive circuitry coupled to the comparator amplifier QB1 to condition the position error signal 104 and provide a conditioned output error signal from amplifier Q1D that is proportionally responsive to the position feedback signal 101 over a frequency range of at least 120 hertz. The differential amplifier Q2D, the proportional amplifier Q1C, and the integral amplifier Q3A, are connected in parallel to receive the position error signal 104.

The amplifier Q1D is the operative component of a combining circuit that receives all of the differential, proportional, integral and feed amplifier circuit outputs from the PID controller circuit 71 to produce a frequency-compensated and conditioned output error signal 107. The signal 107 is proportional to the difference between the feedback signal 101 and the buffered command signal 103 over a frequency range of at least about 120 hertz.

The output signal 107 from the combining amplifier Q1D can be either positive or negative. The signal 107 is coupled to amplifiers Q2B and Q2A which produce an output signal 108 that will always be positive. The absolute value error output signal 108 is proportional to the amplitude of the frequency-compensated error signal 107 irrespective of the polarity of that signal. Together the amplifiers Q2B and Q2A form a full-wave rectifier circuit that is coupled to receive the conditioned output error signal 107 and provide an absolute value error output signal 108 of a predetermined polarity and having an amplitude proportional to the conditioned output error signal 107.

The amplifier Q3C is the operative component of a polarity indicating amplifier circuit that is coupled to receive the conditioned output error signal 107 and to provide a polarity-indicating output signal 109. The signal 109 is governed by the polarity of the conditioned output error signal 107 from the combining circuit amplifier Q1D. Both the polarity-indicating signal 109 and the absolute value error signal 108 are directed as inputs to a current flow regulation circuit Q8. The current flow regulation circuit Q8 is coupled to receive the conditioned output error signal 108 and the polarity-indicating signal 109 and provide control outputs on lines 110 and 111 to operate the rotary solenoid 33.

The current flow regulation circuit Q8 is a model LMD18245 full bridge power amplifier circuit manufactured by National Semiconductor Corporation. The current flow regulation circuit Q8 is a very important element in the control circuit 52 because it allows closed-loop operation.

The current flow regulation circuit Q8 provides no current to the rotary solenoid 33 when the conditioned position feedback signal 102 is equal to the buffered position command signal 103 in FIG. 12. The feedback loop formed by the current flow regulation circuit Q8 is coupled to receive the buffered command signal 103 and the error signal 104 and to provide outputs to the rotary solenoid armature on lines 110 and 111 that rotate the rotary solenoid armature and its shaft 29 in a direction and to an extent so as to minimize the error signal on line 104. The control circuit 52 is thereby coupled between the Hall-effect sensor 39 and the rotary magnetic solenoid 33 to provide control inputs on lines 110 and 111 to the stator S of the rotary magnetic solenoid 33.

The current flow regulation circuit Q8 serves as a full-bridge motor driver power amplifier circuit 75 connected between the frequency compensation circuitry of the PID controller 71 and the rotary magnetic solenoid 33 for providing actuating signals on lines 110 and 111 to the stator S of the rotary magnetic solenoid 33, as illustrated in FIGS. 11 and 12. The current flow regulation circuit Q8 receives the absolute value error output signal 108 at its pin1 4 and the polarity-indicating output signal 109 at pin11 and drives the stator S of the rotary solenoid 33 in accordance therewith. These signals on lines 110 and 111 cause the armature A of the rotary solenoid 33 to rotate in an angular direction which is determined by the polarity-indicating amplifier Q3C to an angle of displacement from the null position, 0°, which is determined by the absolute value output 108 of amplifiers Q2B and Q2A.

The response of the rotary solenoid 33 as manufactured drops off at frequencies above about 60 hertz. The armature A of the rotary solenoid 33 therefore has a response that is frequency dependent. However, the signal-conditioning PID controller circuitry 71 receives the error signal 102 and compensates for frequency variations in the command signal 69 so that the outputs to the rotary solenoid stator S produce uniform responses by the armature A over an enhanced frequency range by the command signal 69 of at least about 120 hertz. The conditioned outputs 108 and 109 to the current flow regulation circuit Q8 are therefore not dependent upon frequency for over a range of at least about 120 hertz.

The values of the components of the schematic circuit of FIG. 12 are listed in Table I. It is important for these values to be selected so as to maximize the bandwidth of frequency response of the rotary solenoid armature to the stator inputs on lines 110 and 111. The proper selection of the components of Table I serves to extend the response bandwidth of the rotary solenoid 33. While the components of Table I have been optimized for the Ultamag rotary actuator size 4EM/4EMM previously described, the values of the components of Table I may have to be adjusted for different models of rotary solenoids. The resistor values are in ohms and the capacitor values are in farads, except as otherwise indicated in Table I.

TABLE I

| Quantity | | Quantity | |
|---|---|---|---|
| | Resistors ⅛ watt 1% Metal Film | | Semiconductors |
| 19 | (R1–R5), (R7–R15, R19, R29, (R31–R33) = 10K | 3 | Q1–Q3 = LM324N quad op-amp with 14 pin DIP sockets |
| 1 | R6 = 1.8K | 1 | Q4 = UGN 3516 Hall-effect transducer (Allegro) |
| 1 | R16 = 6.8K | | |
| 1 | R17 = 56K | 1 | Q5 = LM317T 3-term adj. reg. |
| 2 | R18, R20 = 4.7K | | |
| 1 | R21 - 33K | 1 | Q6 = ICL7660A CMOS volt, conv. (Harris) |
| 1 | R22 = 5K (18 turn trim pot)) | | |
| 1 | R23 = 220 | 1 | Q7 = 78L05 + 5v volt reg. |
| 1 | R24 = 1200 | 1 | Q8 = LMD18245 DMOS full-bridge motor driver (National Semiconductor) |
| 1 | R25 = 5K | | |
| 1 | R26 = 22K | | |
| 1 | R27 = 10K | 1 | D1 = Zenior diod 5.1 volt |
| 1 | R28 = 1 meg | 2 | (D2–D3 = 1N914 |
| 1 | R30 = 1K | | Misc. Hardware |
| | Capacitors | 2 | Heatsinks (T--220) for Q5 & Q8 |
| 3 | C1, C2, C10 = 0.1 UF @ 50 v mono. | 1 | TS terminal strip 5 terminal (AUGAT-.250 spacing) |
| 2 | C4, C5 = 10 UF @16v. Tantilum | 3 | 14 pin DIP sockets |
| | | 1 | 18 pin DIP sockets |
| 3 | C3, C6, C11 = 1.0 UF @ 50v tantilum | | |
| 1 | C7 = 100 UF @ 50v electrolic | | |

TABLE I-continued

| Quantity | Quantity |
| --- | --- |
| 1 | C8 = 2.2 NF ceramic |
| 1 | C9 = 0.45 NF ceramic |

Figure 13:
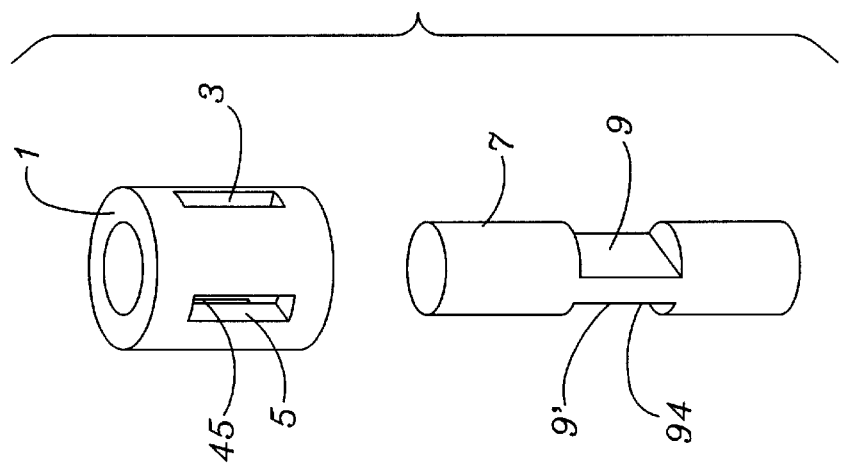
FIG. 13 is an exploded perspective detail illustrating the valve and valve housing employed in the embodiment of the invention illustrated in FIGS. 1–10.

FIG. 13 illustrates the movable valve gate element 7 and the valve housing sleeve 1 of the embodiment of the invention heretofore described in enlarged detail. It should be noted that, in the embodiment of FIGS. 1–13, the valve housing sleeve 1 has a single inlet orifice 47, a single outlet orifice 5, a single first fluid transfer orifice 45, and a single second fluid transfer orifice 47. Depending upon the pressure in the pressurized fluid supply line 67, a significant imbalance of forces on the flow directing faces 9 and 9' may exist. When there is a significant pressure imbalance within the servovalve, the forces tending to return the web 94 of the servovalve to a null or 0° position are markedly increased. As a consequence, this could require the use of a rotary solenoid 33 of greater size to provide the torque necessary to drive the solenoid armature A away from the 0° position. However, the larger the torque required, the greater will be the mass and size of the rotary solenoid 33 that must be used. As the mass of the parts of the rotary solenoid 33 increase, inertia also increases and the time responsiveness of the valve to changing inputs on lines 110 and 111 decreases.

Figure 14:
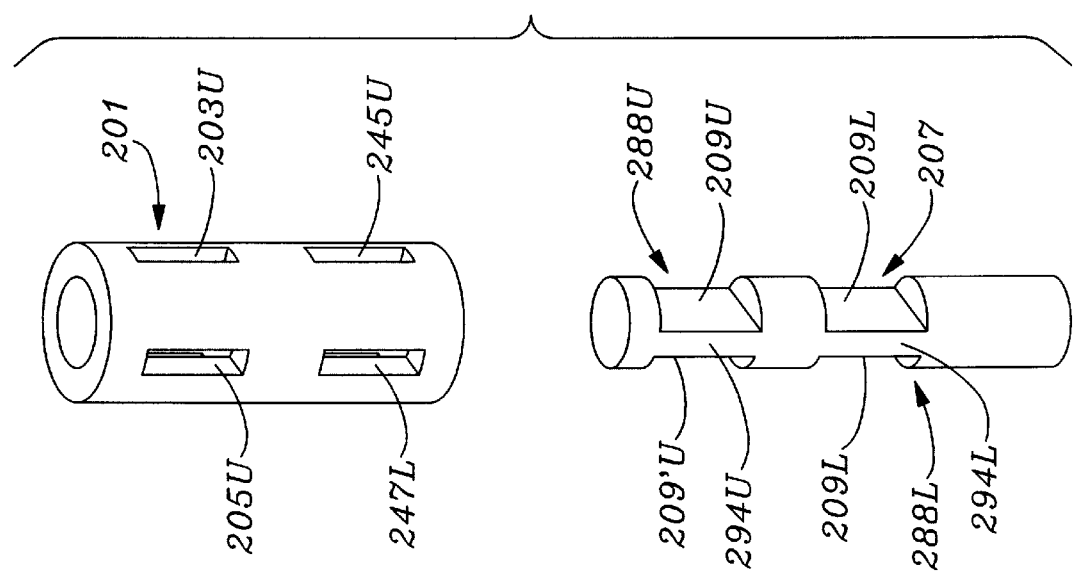
FIG. 14 is an exploded perspective detail illustrating a preferred alternative valve and valve housing which may be employed in the rotary servovalve system of FIG. 10 in place of the embodiment of the valve and valve housing shown in FIG. 13.

A unique system according to a preferred embodiment of the present invention has been devised for obviating and virtually eliminating any force imbalance on the valve components in the rotary servovalve system of the invention. Specifically, and as illustrated in FIG. 14, a housing sleeve 201 and a movable valve gate element 207 may be substituted for the housing sleeve 1 and movable valve gate element 7 depicted in FIG. 13. As shown in FIGS. 14–17, the valve housing sleeve 201 includes an upper and lower set of each of the orifices and each of the gating sections previously described. That is, the valve housing sleeve 201 includes a pair of inlet orifices 247U and 247L (upper and lower), a pair of outlet orifices 205U and 205L, a pair of first fluid control orifices 245U and 245L, and a pair of second fluid control orifices 203U and 203L. The orifices within each pair of orifices are located diametrically opposite and longitudinally offset from each other in the housing sleeve 201. That is, the lower inlet orifice 247L is located below the level of the upper inlet orifice 247U and on the opposite side, one hundred eighty degrees away from the radial alignment of the upper orifice 245U.

Likewise, the lower outlet orifice 205L is located on the opposite side of the housing sleeve 201 from the upper outlet orifice 205U and beneath the level of the upper orifices. The angular displacement of the upper and lower outlet orifices 205U and 205L is likewise one hundred eighty degrees. As a consequence, the lower outlet orifice 205L is located directly beneath and in longitudinal alignment with the upper inlet orifice 247U. Conversely, the lower inlet orifice 247L is located directly beneath and in longitudinal alignment with the upper outlet orifice 205U, as shown in FIG. 14.

In a like manner the upper, first fluid transfer orifice 245U is located on the diametrically opposite side of the housing sleeve 201 from the lower, first fluid transfer orifice 245L. The upper, second fluid transfer orifice 203U is located on the opposite side of the housing sleeve 201 from the lower, second fluid transfer orifice 203L. As a consequence, the upper, first fluid transfer orifice 245U is located directly above the lower, second fluid transfer orifice 203L. The upper, second fluid transfer orifice 203U is located directly above the lower first fluid transfer orifice 245L, as illustrated in FIG. 14.

Similarly, the movable valve member 207 has an upper gate section 288U and an lower gate section 288L. The upper gate section 288U has a pair of mutually parallel faces 209U and 209'U located equidistant from the axis of rotation of the movable valve member 207. Similarly, the lower gating section 288L has a pair of flow directing faces 209L and 209'L, mutually parallel to each other and located the same distance from the valve axis of rotation as the upper fluid flow directing faces 209U and 209'U. The flow directing faces 209U and 209L therefore reside in the same vertically oriented plane while the flow directing facts 209'U and 209'L reside in the same vertically oriented plane As illustrated in FIG. 14, the pair of flow directing faces 209U and 209L in the upper gating section 288U and the pair of flow directing faces 209L and 290'L in the lower gating section 288L are longitudinally offset from each other. They are longitudinally aligned with the upper and lower pairs of orifices in the housing sleeve 201. That is, the gating section 288U is aligned with the upper orifices to 247U, 205U, 203U, and 245U. Similarly, the lower gating section 288L is longitudinally aligned with the lower orifices 247L, 205L, 203L, and 245L.

The orifices in each pair of orifices are interconnected to provide alternative flow paths into and out of the valve housing sleeve 201 from opposite sides thereof. This prevents an imbalance from existing in the valve housing sleeve 201.

More specifically, when a pressure is applied to one flow-directing valve face in the upper gating section 288 through the high-pressure inlet orifice 247U, an equal and diametrically opposite force is applied against one of the flow-directing faces in the lower section 288L of the movable valve gate element 207. As a consequence, equal and diametrically opposed, radially directed forces act at all times upon the movable valve gate element 207. Therefore, the movable valve element 207 is in a state of equilibrium from the equal and opposite dynamic fluid forces acting upon it. This reduces the torque necessary to rotate the removable valve element 207. As a consequence, the massiveness of the rotary solenoid components employed in the rotary solenoid 33 can be reduced, thereby improving the response time of the rotary solenoid 33.

FIGS. 15, 16, and 17 illustrate the interconnection of the orifices in each set of orifices. In a system employing the valve sleeve 201 and the valve gate element 207 shown in FIG. 14. That is, each of the two inlet orifices 247U and 247L are connected to separate inlet orifices 217U and 217L, both of which are connected to the same high-pressure fluid supply line 67 by means of a channel, duct, or connecting line 267. Likewise, the outlet orifices 205U and 205L are both connected to the return line 62 by means of an interconnecting passage 262.

In a like manner, the pair of first fluid transfer orifices 245U and 245L are connected together by an interconnecting duct or line 216 so that both of the first fluid transfer orifices 245U and 245L are connected to the line 16 leading to the cylinder fluid cavity section 51 of the actuator cylinder 55. Likewise, both of the second fluid transfer orifices 203U and 203L are connected together by a connection line 261, so that both of the second fluid transfer orifices 203U and 203L are connected to the fluid transfer line 61 that leads to the cylinder fluid cavity section 59 of the actuator cylinder 55.

FIG. 15 illustrates the condition of the orifices of the valve housing sleeve 201 when the armature shaft 29 is at the null or 0° position. As in the embodiment of FIG. 1 illustrated in FIG. 10, all of the valve orifices are blocked by the upper web 294U and the lower web 294L of the movable valve gate element 207.

FIG. 16 illustrates the interconnection and direction of fluid flow when the movable valve gate element 207 has been moved in a clockwise direction from the position depicted in FIG. 15. As is evident in FIG. 16, the flow to the first cylinder fluid cavity 51 and from the second fluid cylinder cavity 59 in the fluid actuator cylinder 55 is the same as the flow that exists when the movable valve gate element 7 is in the position depicted in FIG. 9. However, in the embodiment of FIGS. 14–17, there is no pressure imbalance within the valve housing sleeve 201, since equal and opposing radial forces act upon the movable valve gate element 207 regardless of the pressure in the system.

The same is true in FIG. 17 which illustrates the direction of fluid flow when the armature shaft 29 turns the rotatable valve element 207 in a counterclockwise direction from the null or 0° position, as indicated in FIG. 8. With the valve element 207 turned in the counterclockwise direction from the position of FIG. 15, as shown in FIG. 17, fluid flow is from the high-pressure supply line 67, into the inlet orifices 247U and 247L that are connected together by line 267, through the second fluid transfer valve orifices 203U and 203L, that are connected together by line 261, to the actuator cylinder cavity 59. Concurrently, fluid flows from the first cylinder fluid cavity 51 through line 16 to both of the first fluid transfer orifices 245L and 245U, which are interconnected by the line 216. The fluid flows out of the valve housing sleeve 201 to the outlet orifices 205U and 205L, through the connecting line 262 and on to the return line 62 leading to the reservoir 49.

By employing the innovative servovalve structure of the type depicted in FIGS. 14–17, the system is relieved of pressure imbalances within the valve housing 201, since equal and opposite forces always act on the sides of the movable valve gate element 207 from opposite radial directions. As a consequence, smaller, lighter-weight components can be utilized in the rotary solenoid actuator, thus improving the responsive of the valve to changing signals to the solenoid actuator.

Undoubtedly, numerous variations and modifications of the invention will become readily apparent to those familiar with servovalve system. For example, while particular, preferred operating mechanical and electrical components have been described, alternative components may be utilized in place of those suggested. Accordingly, the scope of the invention should not be construed as limited to the specific embodiments depicted and described.

What is claimed is:

1. A rotary servovalve system comprising:
   a pressurized fluid supply source,
   a fluid reservoir having a fluid pressure lower than that of said fluid supply source,
   a fluid transfer valve housing having a wall of annular cross section and at least one fluid inlet port coupled to said fluid supply source, at least one fluid outlet port coupled to said fluid reservoir and located diametrically opposite said fluid inlet port and at least one first fluid control port and at least one second fluid control port located diametrically opposite each other and equidistant from said inlet and outlet ports,
   a movable valve member located within said valve housing and alternatively rotatable in opposite angular directions from a closed position in which flow through all of said ports is blocked to positions in which each of said first and second fluid control ports alternatively permits flow therethrough from said fluid inlet port while the other of said first and second fluid control ports concurrently permits flow therethrough to said reservoir,
   a rotary magnetic solenoid having an electrically activated stator and an armature with at least one permanent magnet thereon alternatively rotatable relative to said stator in opposing angular directions from a null position and said at least one permanent magnet returns said armature to said null position when said stator is deactuated, and said armature drives said movable valve member so that said movable valve member is in said closed position when said armature is in said null position,
   a position sensor located proximate to said rotary magnetic solenoid to provide a feedback signal indicative of the position and direction of rotation of said armature relative to said null position, and
   a control circuit responsive to said position sensor to provide a feedback electrical signal having an electrical frequency response bandwidth of at least about one hundred twenty hertz to said stator to move said movable valve member co a target angular orientation relative to said valve housing.

2. A rotary servovalve system according to claim 1 wherein said control circuit includes:
   a comparator circuit for receiving said feedback signal and an externally generated command signal and for providing an error signal representing the difference between said feedback signal and said command signal,
   an error signal processing circuit including a proportional amplifier circuit, a differential amplifier circuit, and an integral amplifier circuit, each of which provides a separate output, and
   a combining circuit that receives all of said outputs from said processing circuit to produce a frequency compensated error signal proportional to the difference between said feedback signal and said command signal over a frequency range of at least about one hundred twenty hertz.

3. A rotary servovalve system according to claim 2 further comprising an absolute value amplifier circuit coupled to said combining circuit and providing an absolute value error output signal proportional to the amplitude of said frequency compensated error signal irrespective of the polarity thereof, a polarity indicating amplifier circuit coupled to said combining circuit to produce an output indicative of the polarity of said frequency compensated error signal, and a current flow regulation circuit that drives said stator of said rotary magnetic solenoid to cause said armature to rotate in an angular direction which is determined by said polarity indicating amplifier circuit to an angle of displacement from said null position which is determined by said absolute value amplifier circuit.

4. A rotary servovalve system according to claim 1 wherein said rotary magnetic solenoid and said movable valve member are axially aligned with and longitudinally displaced from each other, and further comprising a coupling member joining said solenoid armature to said movable valve member.

5. A rotary servovalve system comprising
   a pressurized fluid supply having a pressure supply line leading therefrom,
   a fluid reservoir having a fluid relief line leading thereto,
   a valve housing having a valve cavity of circular cross section defined therewithin and defining at least one rectangular input port to said valve cavity coupled to said pressure supply line, at least one rectangular outlet port from said valve cavity coupled to said relief line and located diametrically opposite said inlet port, and at least one first rectangular fluid control port and at least one second rectangular fluid control port in communication with said valve cavity and said first and second control ports are located diametrically opposite each other and equidistant from said inlet and outlet ports,
   a bidirectional valve closure element having a gate portion with at least one pair of mutually parallel, longitudinally oriented and longitudinally aligned flow directing faces of rectangular shape and said valve closure element is located within said valve cavity and is coaxially aligned and rotatable therewithin to, in the alternative: (1) create concurrent flow paths between said first fluid control port and said inlet port and between said second fluid control port and said outlet port, (2) block all of said ports, and (3) create concurrent flow paths between said second fluid control port and said inlet port and between said first fluid control port and said outlet port, and
   a rotary solenoid having a stator and an armature with at least one permanent magnet rotatable within said stator between two extreme positions and biased toward a null position midway between said two extreme positions by magnetic force from said permanent magnet, and said armature is joined to said valve closure element so that when said armature is at said null position said valve closure element blocks all of said ports as aforesaid,
   a position sensor located proximate to said rotary solenoid to provide a feedback signal indicative of the position and direction of rotation of said armature relative to said null position, and
   a control circuit responsive to said position sensor to provide a feedback electrical signal having an electrical frequency response bandwidth of at least about one hundred twenty hertz to said stator to move said valve closure element to a target orientation relative to said valve housing.

6. A rotary servovalve system according to claim 5 further characterized in that said position sensor is comprised of a Hall-effect magnetic sensor located proximate to said rotary solenoid and which detects the direction and extent of angular rotation of said solenoid armature from said null position and which provides an electrical position feedback signal indicative thereof, and said control circuit is responsive to rotation of said armature and includes:
   a position command signal source that provides an electrical position command signal,
   a comparator that receives said position feedback signal and said position command signal and which produces a position error signal,
   frequency sensitive circuitry coupled to said comparator to condition said position error signal and provide a conditioned output error signal having an amplitude that is proportionally responsive to said position feedback signal over a frequency range of at least about one hundred twenty hertz, and
   a current flow regulation circuit coupled to receive said conditioned output error signal and provide control outputs to operate said rotary solenoid and which provides no current to said rotary solenoid when said position feedback signal is equal to said position command signal.

7. A rotary servovalve system according to claim 6 wherein said frequency sensitive circuitry includes a differential amplifier circuit, a proportional amplifier circuit and an integral amplifier circuit which are connected in parallel to each receive said position error signal, and a combining circuit which receives the outputs from said differential, proportional, and integral amplifier circuits and which provides said conditioned output error signal.

8. A rotary servovalve system according to claim 7 further comprising a rectifier circuit coupled to receive said conditioned output error signal and to provide an absolute value error output signal of a predetermined polarity and having an amplitude proportional to said conditioned output error signal, and a polarity indicating amplifier circuit coupled to receive said conditioned output error signal and to provide a polarity indicating output governed by the polarity of said conditioned output error signal, and a full bridge power amplifier motor driver circuit that receives said absolute value error output signal and said polarity indicating output and which drives said stator of said rotary solenoid in accordance therewith.

9. A rotary servovalve system according to claim 5 wherein said valve closure element and said armature are coaxially aligned with each other and longitudinally offset from each other, and further comprising an annular coupling member secured to both said valve closure element and to said armature.

10. A rotary servovalve system according to claim 5 further characterized in that said position sensor is a Hall-effect magnetic sensor located proximate to said armature to detect rotation of said armature relative to said stator and which provides an electrical feedback signal indicative of direction and extent of angular rotation of said armature relative to said stator, and said control circuit receives said feedback signal and an externally generated command signal and generates an error signal indicative of the difference between said feedback signal and said error signal, and said control circuit is further comprised of a feedback loop coupled to receive said command and error signals and to provide outputs to said rotary solenoid armature to rotate it in a direction and to an extent so as to minimize said error signal.

11. A rotary servovalve system according to claim 10 wherein said armature has a response that is frequency dependent and further comprising signal conditioning circuitry for receiving said error signal and for compensating for frequency variations in said command signal so that said outputs to said rotary solenoid armature produce uniform responses by said armature over a frequency range by said command signal of at least about one hundred twenty hertz.

12. In a rotary servovalve system in which fluid is directed through at least one inlet port, at least one outlet port, at least one first fluid control port, and at least one second fluid control port in a valve housing as directed by a movable valve gate element rotatable within said housing in opposite directions of angular rotation from a position prohibiting fluid flow through any of said ports to alternative positions permitting fluid flow in alternative opposite directions through each of said first and second fluid control ports, the improvement comprising:

a rotary magnetic solenoid having an armature that includes at least one permanent magnet and which is rotatable relative to a stator formed as an electromagnet that is energizable to alternatively create electromagnetic fields having opposite polarities from each other and which, when deenergized, allows said armature to return to a neutral null position from positions of orientation in opposite angular directions, and said armature is coupled to carry said movable valve gate element in angular rotation therewith, a position sensor located proximate to said rotary magnetic solenoid and which senses the position of said solenoid armature relative to said stator and provides a feedback signal responsive thereto, and a control circuit coupled between said position sensor and said rotary magnetic solenoid to provide control inputs having an electrical frequency response bandwidth of at least about one hundred twenty hertz to said stator of said rotary magnetic solenoid.

13. A rotary servovalve system according to claim 12 wherein said control circuit receives an externally generated command signal and said control circuitry includes a comparator circuit to compare said feedback signal with said command signal and to provide an error signal in accordance with the difference therebetween, and a frequency compensation circuitry coupled to receive said error signal and provide conditioned outputs that are not dependent upon frequency over a range of at least about one hundred twenty hertz.

14. A rotary servovalve system according to claim 13 further comprising a full bridge motor driver amplifier circuit connected between said frequency compensation circuitry and said rotary magnetic solenoid for providing actuating signals to said stator.

15. A rotary servovalve system according to claim 12 further comprising an intermediate coupler that joins said armature to said movable valve gate element.

* * * * *